United States Patent
Semenov et al.

(10) Patent No.: US 11,981,309 B2
(45) Date of Patent: May 14, 2024

(54) BRAKE ASSIST DURING VEHICLE ONE PEDAL DRIVE

(71) Applicant: Ford Global Technologies, LLC, Dearborn, MI (US)

(72) Inventors: Sergey Gennadievich Semenov, Farmington Hills, MI (US); Angel Fernando Porras, Dearborn, MI (US); Devin James O'Donnell, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 889 days.

(21) Appl. No.: 17/035,545

(22) Filed: Sep. 28, 2020

(65) Prior Publication Data
US 2022/0097660 A1    Mar. 31, 2022

(51) Int. Cl.
*B60T 7/12*    (2006.01)
*B60T 8/17*    (2006.01)
*B60T 8/32*    (2006.01)
*B60T 13/74*   (2006.01)
B60T 1/00     (2006.01)
B60T 1/02     (2006.01)

(52) U.S. Cl.
CPC .............. *B60T 7/12* (2013.01); *B60T 8/17* (2013.01); *B60T 8/3215* (2013.01); *B60T 13/74* (2013.01); B60T 1/005 (2013.01); B60T 1/02 (2013.01); B60T 2201/10 (2013.01); B60T 2220/00 (2013.01); B60T 2250/00 (2013.01); B60T 2250/04 (2013.01); B60T 2270/89 (2013.01)

(58) Field of Classification Search
CPC . B60T 7/12; B60T 8/17; B60T 8/3215; B60T 13/74; B60T 1/005; B60T 1/02; B60T 2201/10; B60T 2220/00; B60T 2250/00; B60T 2250/04; B60T 2270/89; B60T 13/662
See application file for complete search history.

(56) References Cited

U.S. PATENT DOCUMENTS

| | | | |
|---|---|---|---|
| 8,924,105 B1 * | 12/2014 | Miesterfeld | B60T 7/12 701/53 |
| 10,150,461 B2 | 12/2018 | Crombez | |
| 2018/0304869 A1 * | 10/2018 | Hernandez | B60T 7/042 |
| 2019/0135249 A1 * | 5/2019 | Fridman | F16D 55/226 |
| 2020/0216044 A1 * | 7/2020 | Chow | B60T 8/171 |
| 2023/0022163 A1 * | 1/2023 | Kamio | B60L 15/2018 |
| 2023/0050845 A1 * | 2/2023 | Zhang | B60T 8/52 |

FOREIGN PATENT DOCUMENTS

GB      2455507 A    6/2009
JP      2019181992 A  10/2019

* cited by examiner

Primary Examiner — Mussa A Shaawat
(74) Attorney, Agent, or Firm — David B. Kelley; Brooks Kushman P.C.

(57) ABSTRACT

A vehicle includes friction brakes, an electronic park brake system, and controllers. The controllers, responsive to the vehicle coming to a stop, and the vehicle being on plug, a driver door of the vehicle being open, or a driver seatbelt being unbuckled, issue a standstill friction brake request for the friction brakes and an electronic park brake request for the electronic park brake system. The controllers also, responsive to engagement of the electronic park brake system, discontinue the issue of the standstill friction brake request.

12 Claims, 3 Drawing Sheets

BRAKE ASSIST DURING VEHICLE ONE PEDAL DRIVE

TECHNICAL FIELD

This disclosure relates to control of a vehicle during one pedal driving.

BACKGROUND

The powertrain of a vehicle with an electric generator/motor may consume energy to propel the vehicle forward and generate energy to slow or stop the vehicle. This regenerative braking captures kinetic energy associated with movement of the vehicle and transforms it into electrical energy for storage in a battery.

In one pedal driving mode, a driver may not need to press the brake pedal to slow the vehicle or bring the vehicle to a stop. Just as pressing the accelerator pedal may cause the motor to propel the vehicle forward, releasing the accelerator pedal may cause the generator to regeneratively brake the vehicle—without use of the friction brakes.

SUMMARY

A vehicle includes friction brakes, an electronic park brake system, and one or more controllers. The one or more controllers, responsive to the vehicle coming to a stop and a driver door of the vehicle being open, issue a standstill friction brake request for the friction brakes and an electronic park brake request for the electronic park brake system, and responsive to engagement of the electronic park brake system, discontinue the issue of the standstill friction brake request.

A method for controlling a vehicle includes, responsive to the vehicle coming to a stop and being on plug, issuing a standstill friction brake request for friction brakes and an electronic park brake request for an electronic park brake system, and responsive to engagement of the electronic park brake system, discontinuing the issue of the standstill friction brake request.

A vehicle includes friction brakes, an electronic park brake system, and one or more controllers. The one or more controllers, responsive to the vehicle coming to a stop and a driver seat belt of the vehicle being unbuckled, issue a standstill friction brake request for the friction brakes and an electronic park brake request for the electronic park brake system, and responsive to engagement of the electronic park brake system, discontinue the issue of the standstill friction brake request.

DETAILED DESCRIPTION

Figure 1:
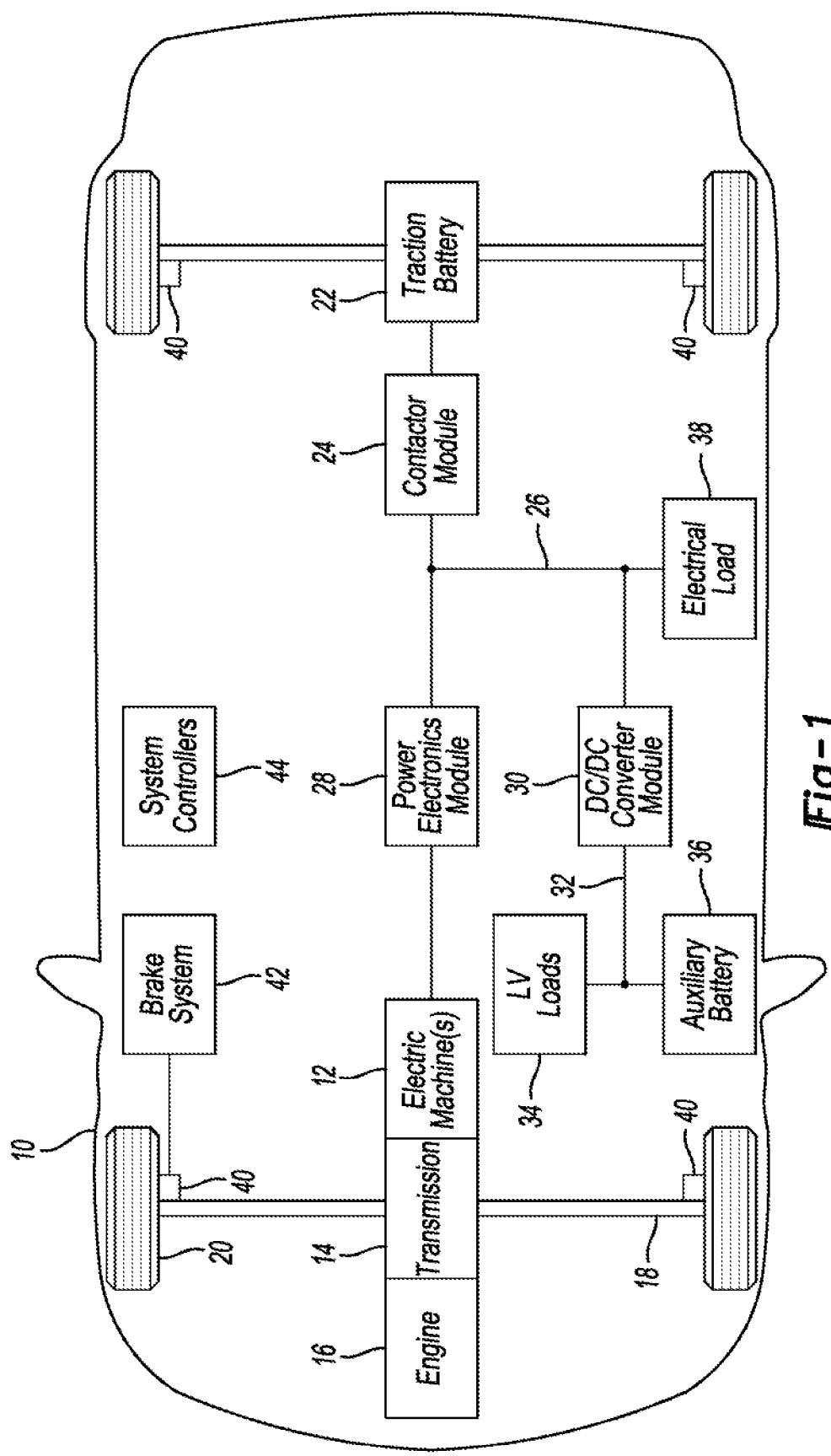
FIG. 1 is a schematic diagram of a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One pedal drive may give more control to the accelerator pedal with increased lift pedal regenerative braking and the ability to bring the vehicle to a stop without input from the brake pedal on a range of grades. It may be enabled responsive to driver input, such as a button press or speed being less than some threshold.

A one pedal drive low speed controller may control the vehicle to a complete stop from low speeds via powertrain torque modification when the vehicle is in one pedal drive mode and the customer has tipped out of the accelerator pedal. In one pedal drive however, a driver may get accustomed to the vehicle staying perfectly stationary at a stop without any driver action. This may include leaving the vehicle while at a stop and in drive gear, or when the vehicle is put on plug for charging.

Typically, during both driver egress at a stop and the vehicle being plugged in, the vehicle may shift itself automatically into Park and the powertrain may remove torque from the wheels. This may result in elements of the transmission rolling against the parking pawl, especially on grades. This may be undesirable in one pedal drive mode. Friction brakes may thus be used to hold the vehicle. Electric park brake systems for example, may be suitable for holding the vehicle still for long periods of time. It may, however, take time for the electric park brakes to engage. So, the powertrain controls, the friction brakes, and the electric park brake actions should be coordinated to achieve standstill.

The low speed controller may thus ensure vehicle standstill at one pedal drive stop even if the powertrain removes torque from the wheels and cannot support holding the vehicle at standstill. This may occur, for example, when the driver's door is open or its status is unknown, or the vehicle is on plug. The low speed controller may request the electronic parking brake when the vehicle has come to a stop, one pedal drive standstill brakes have been requested, and one of the above conditions is true. After the electronic park brake has been requested, the low speed controller monitors its status and keeps requesting the one pedal drive standstill brakes until the electronic parking brake is applied, or indefinitely, if the is no indication that the electronic parking brake has been applied. Release of the electronic parking brake can then be handled in the same way as when the electronic parking brake is applied for any other reason.

With reference to FIG. 1, electrified vehicle 10 may include one or more electric machines 12 mechanically coupled to a gearbox or hybrid transmission 14. The electric machines 12 may operate as a motor and a generator. In addition, the hybrid transmission 14 is mechanically coupled to an engine 16. The hybrid transmission 14 is also mechanically coupled to a drive shaft 18 that is mechanically coupled to wheels 20. The electric machines 12 can provide propulsion and regenerative braking capability when the engine 16 is on or off, and allow the vehicle 10 to be operated in electric mode with the engine 16 off under certain conditions. The vehicle 10, in other arrangements, may lack the engine 16 (e.g., a battery electric vehicle). Other architectures are also contemplated.

A battery pack or traction battery 22 stores energy that can be used by the electric machines 12. The traction battery 22 may provide a high voltage direct current (DC) output. A contactor module 24 may include one or more contactors configured to isolate the traction battery 22 from a high voltage bus 26 when opened and connect the traction battery 22 to the high voltage bus 26 when closed. The high voltage bus 26 may include power and return conductors for carrying current. One or more power electronics modules 28 (e.g., inverters) may be electrically coupled to the high voltage bus 26. The power electronics modules 28 are also electrically coupled to the electric machines 12 and provide the ability to bi-directionally transfer energy between the traction battery 22 and the electric machines 12. For example, the traction battery 22 may provide a DC voltage while the electric machines 12 may operate with a three phase alternating current (AC) to function. The power electronics module 28 may convert the DC voltage to three phase AC current to operate the electric machines 12. In regenerative mode, the power electronics module 28 may convert the three phase AC current from the electric machines 12 acting as generators to DC voltage compatible with the traction battery 22.

In addition to providing energy for propulsion, the traction battery 22 may provide energy for other vehicle electrical systems. The vehicle 10 may include a DC/DC converter module 30 that converts the high voltage DC output from the high voltage bus 26 to a low voltage DC level of a low voltage bus 32 that is compatible with low voltage loads 34. An output of the DC/DC converter module 30 may be electrically coupled to an auxiliary battery 36 (e.g., 12V battery) for charging the auxiliary battery 36. The low voltage loads 34 may be electrically coupled to the auxiliary battery 36 via the low voltage bus 32. One or more high voltage electrical loads 38 may be coupled to the high voltage bus 26. The high voltage electrical loads 38 may have an associated controller that operates and controls the high voltage electrical loads 38 when appropriate. Examples of high voltage electrical loads 38 include a fan, an electric heating element, an air conditioning compressor, etc.

Wheel brakes 40 may be also provided for braking and preventing motion of the vehicle 10. The wheel brakes 40 may be hydraulically actuated, electrically actuated, or some combination thereof. The wheel brakes 40 may be a part of a brake system 42. The brake system 42 may include other components such as motors, etc. to implement an electronic park brake system. For simplicity, FIG. 1 depicts a single connection between the brake system 42 and one of the wheel brakes 40. A connection between the brake system 42 and the other wheel brakes 40 is implied. The brake system 42 may include a controller to monitor and coordinate its activities. The brake system 42 may monitor the brake components and control the wheel brakes 40. The brake system 42 may respond to driver commands and may also operate autonomously to implement features such as stability control. The controller of the brake system 42 may implement a method of applying a requested brake force when requested by another controller or sub-function.

Figure 2:
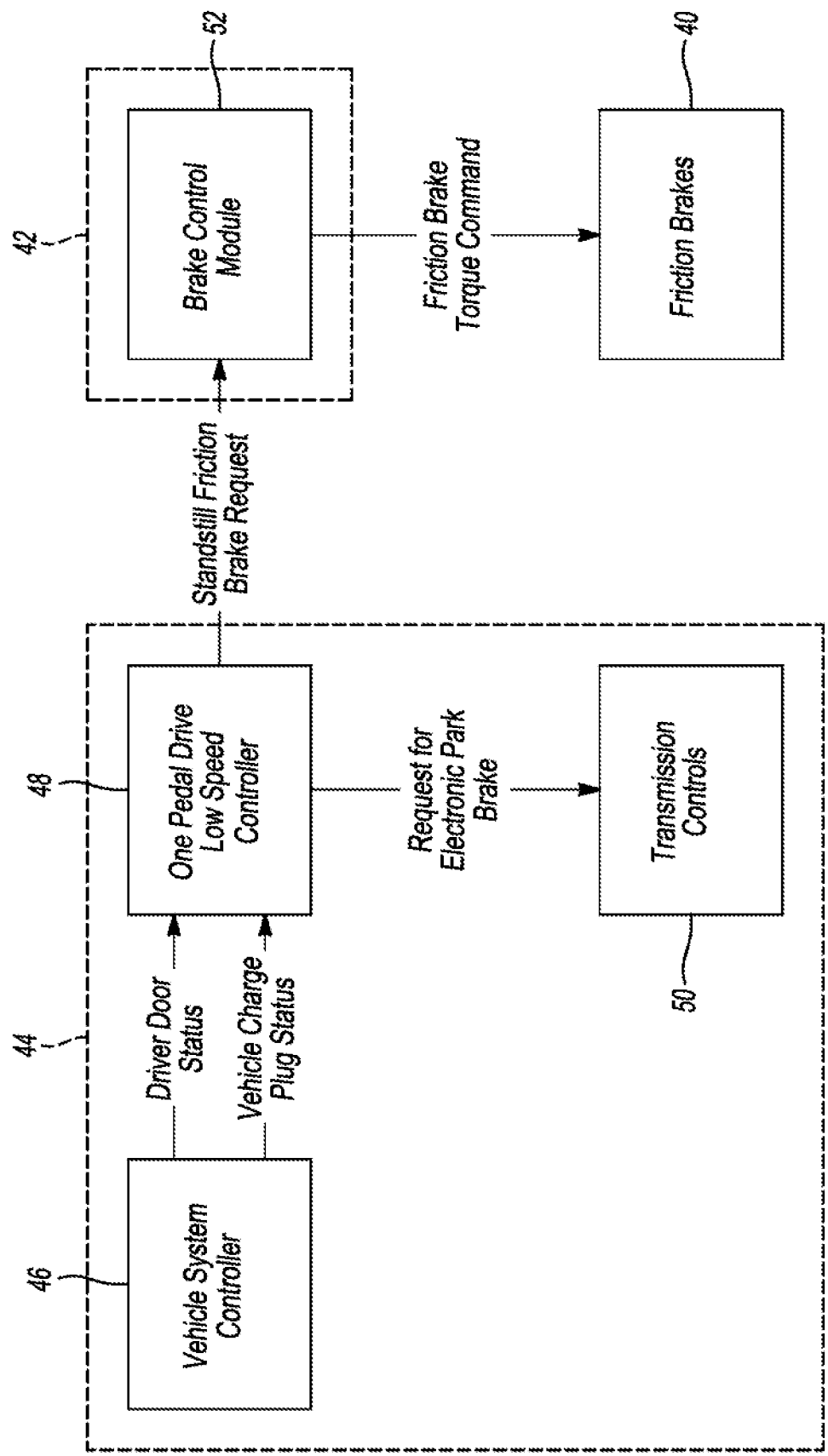
FIG. 2 is a block diagram of a portion of the vehicle of FIG. 1

System controllers 44 may further be present to coordinate the operation of the various components. With reference to FIG. 2, the system controllers 44 include a vehicle system controller 46, a one pedal drive low speed controller 48, and transmission controls 50. The brake system 42 includes a brake control module 52. The vehicle system controller 46 issues driver door status, driver seat belt buckle status, and vehicle charge plug status indicators, which are received by the one pedal drive low speed controller 48. The one pedal drive low speed controller 48 in response issues a request for electronic park brake to the transmission controls 50 accordingly, which may then honor such request. The one pedal drive low speed controller 48 also issues a standstill friction brake request, which is received by the brake control module 52. The brake control module 52 in response issues a friction brake torque command to the friction brakes 40.

Electronic modules and sensors in the vehicle 10, such as those shown in FIGS. 1 and 2, may communicate via one or more vehicle networks. The vehicle networks may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 36. Different signals may be transferred over different channels of the vehicle network. For example, video signals may be transferred over a high speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 10. Moreover, standard sensors such as wheel speed sensors, door sensors, seat belt sensors, park brake sensors, etc. can be used to collect the data necessary for the determinations contemplated herein.

Figure 3:
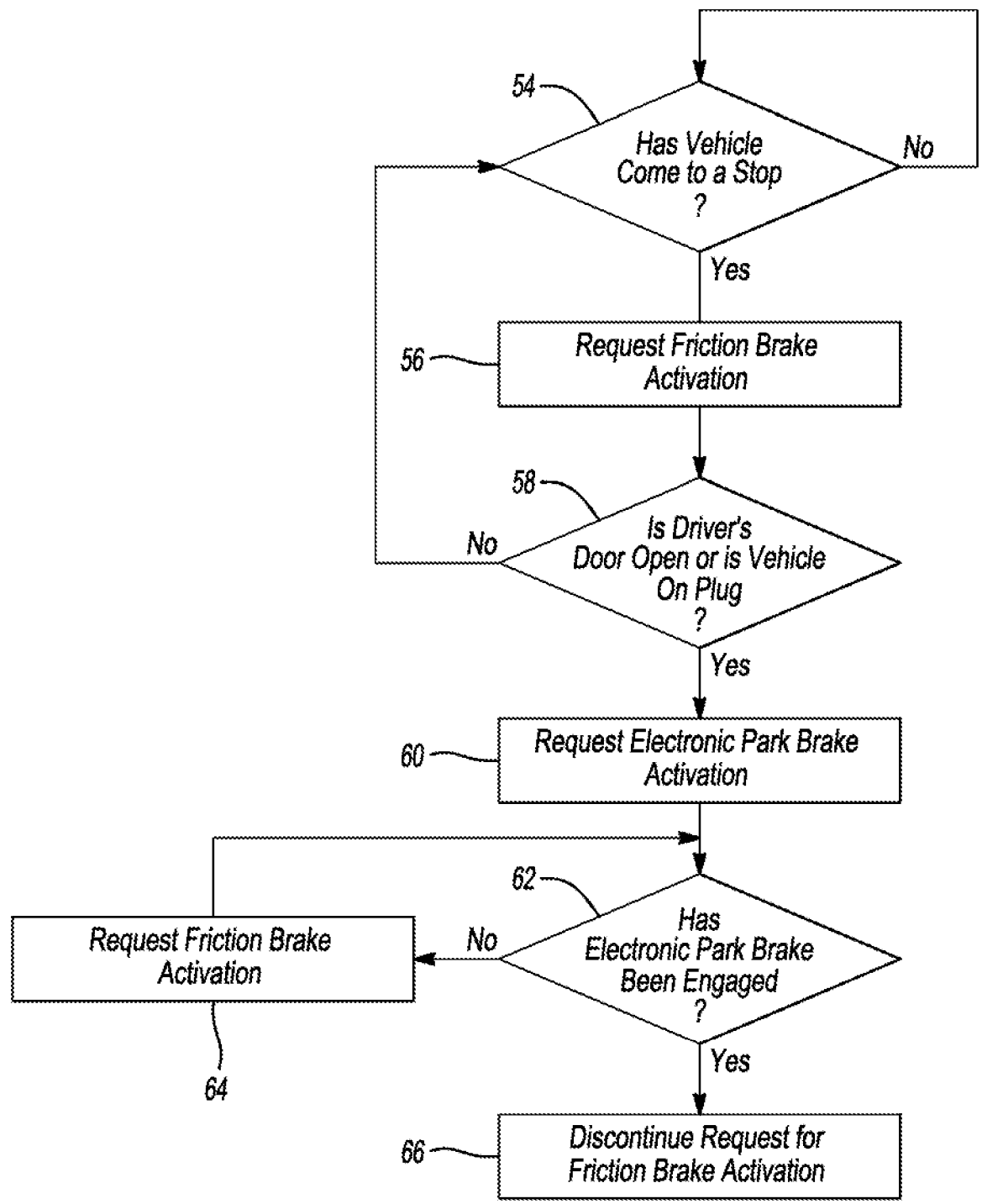
FIG. 3 is a flow chart of an algorithm for the vehicle of FIG. 1.

With reference to FIG. 3, at operation 54 it is determined whether the vehicle has come to a stop. If no, the algorithm returns to operation 54. If yes, friction brake activation is requested at operation 56. At operation 58, it is determined whether the driver's door is open, if the driver's seat belt is unbuckled, or the vehicle is on plug. If no, the algorithm returns to operation 54. If yes, electronic park brake activation is requested at operation 60. At operation 62, it is determined whether the electronic park brake has been engaged. If no, friction brake activation is requested again at operation 64. The algorithm then returns to operation 62. If yes, the request for friction brake activation is discontinued at operation 66.

Control logic or functions performed by the controllers are represented by flow charts or similar diagrams in the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   friction brakes;
   an electronic park brake system; and
   one or more controllers programmed to,
      responsive to the vehicle coming to a stop and a driver door of the vehicle being open, issue a standstill friction brake request for the friction brakes and an electronic park brake request for the electronic park brake system, and
      responsive to engagement of the electronic park brake system, discontinue the issue of the standstill friction brake request.

2. The vehicle of claim 1, wherein the one or more controllers is further programmed to repeatedly issue the standstill friction brake request absent the engagement.

3. The vehicle of claim 1, wherein the one or more controllers is further configured to, responsive to the vehicle coming to a stop and being on plug, issue the standstill friction brake request and the electronic park brake request.

4. The vehicle of claim 1, wherein the one or more controller is further programmed to, responsive to the vehicle coming to a stop and a driver seat belt of the vehicle being unbuckled, issue the standstill friction brake request and the electronic park brake request.

5. A method for controlling a vehicle, comprising:
   by one or more controllers,
      responsive to the vehicle coming to a stop and being on plug, issuing a standstill friction brake request for friction brakes and an electronic park brake request for an electronic park brake system, and
      responsive to engagement of the electronic park brake system, discontinuing the issuing of the standstill friction brake request.

6. The method of claim 5 further comprising repeatedly issuing the standstill friction brake request absent the engagement.

7. The method of claim 5 further comprising, responsive to the vehicle coming to a stop and a driver door of the vehicle being open, issuing the standstill friction brake request and the electronic park brake request.

8. The method of claim 5 further comprising, responsive to the vehicle coming to a stop and a driver seat belt of the vehicle being unbuckled, issuing the standstill friction brake request and the electronic park brake request.

9. A vehicle comprising:
   friction brakes;
   an electronic park brake system; and
   one or more controllers programmed to,
      responsive to the vehicle coming to a stop and a driver seat belt of the vehicle being unbuckled, issue a standstill friction brake request for the friction brakes and an electronic park brake request for the electronic park brake system, and
      responsive to engagement of the electronic park brake system, discontinue the issue of the standstill friction brake request.

10. The vehicle of claim 9, wherein the one or more controllers is further programmed to repeatedly issue the standstill friction brake request absent the engagement.

11. The vehicle of claim 9, wherein the one or more controllers is further configured to, responsive to the vehicle coming to a stop and a driver door of the vehicle being open, issue the standstill friction brake request and the electronic park brake request.

12. The vehicle of claim 9, wherein the one or more controllers is further configured to, responsive to the vehicle coming to a stop and being on plug, issue the standstill friction brake request and the electronic park brake request.

* * * * *